United States Patent [19]

Lempkowicz et al.

[11] 4,126,660

[45] Nov. 21, 1978

[54] PROCESS FOR THE MANUFACTURE OF ORIENTED SHEETS OF THERMOPLASTIC RESIN WHICH ARE PROTECTED AGAINST THE ACTION OF ULTRAVIOLET RAYS

[75] Inventors: Axel Lempkowicz, Brussels, Belgium; Jean Nanoux, Abbeville, France; Jean-Francois Bequet, Rhode Saint-Genese, Belgium

[73] Assignee: Solvay & Cie., Brussels, Belgium

[21] Appl. No.: 814,101

[22] Filed: Jul. 8, 1977

[30] Foreign Application Priority Data

Aug. 4, 1976 [FR] France ............................... 76 24020

[51] Int. Cl.$^2$ ............................................. B29D 7/20
[52] U.S. Cl. ............................ 264/101; 260/45.95 F; 264/210 R; 264/289; 264/343
[58] Field of Search ................. 264/210 R, 289, 343, 264/286, 101; 260/45.95 F; 425/336

[56] References Cited

U.S. PATENT DOCUMENTS

| 2,919,259 | 12/1959 | Naylor et al. | 260/45.95 F |
|---|---|---|---|
| 3,254,146 | 5/1966 | Quinn | 264/289 |
| 3,446,886 | 5/1969 | Karickhoff | 264/289 |
| 3,582,398 | 6/1971 | Ringler | 260/45.95 F |
| 3,744,952 | 7/1973 | Bequet et al. | 425/336 |
| 3,834,853 | 9/1974 | Bequet et al. | 425/336 |
| 3,892,889 | 7/1975 | Cohnen et al. | 260/45.95 F |

*Primary Examiner*—Jeffery R. Thurlow
*Attorney, Agent, or Firm*—Spencer & Kaye

[57] ABSTRACT

Process for the manufacture of oriented sheets of thermoplastic resin which are protected against the action of ultraviolet rays by applying, to at least one of the faces of the sheet, a solution comprising at least a solvent exerting a swelling action on the resin and at least one anti-UV agent which is soluble in the solvent and causing the solvent to evaporate. The treatment is applied before the orienting step by stretching, the sheets being at a temperature favoring orientation by stretching.

8 Claims, No Drawings

PROCESS FOR THE MANUFACTURE OF ORIENTED SHEETS OF THERMOPLASTIC RESIN WHICH ARE PROTECTED AGAINST THE ACTION OF ULTRAVIOLET RAYS

The present invention relates to a process for the manufacture of oriented sheets of thermoplastic resin which are protected against the action of ultraviolet rays.

It is known that it is possible significantly to improve the mechanical properties of sheets of a thermoplastic resin by subjecting them to an orientation treatment.

A technique for the direct manufacture of oriented sheets of thermoplastic resin consists of extruding a thick sheef from this resin, conditioning this sheet to a temperature favourable for its orientation by stretching, stretching this conditioned sheet in at least one direction so as to induce orientation tensions therein, and cooling the sheet, kept under tension, to a temperature below the second order transition temperature of the resin so as to fix the orientation tensions induced. During the stretching treatment, or preferably just after this stretching, it is furthermore possible to impart to the sheet a particular shape such as, for example, a wavy shape, as has been described in U.S. Pat. Nos. 3,744,952 and 3,834,853. These sheets are used especially for the covering of roofs and the cladding of facades.

It is known furthermore that the ultraviolet rays exert a very harmful action on the mechanical properties of the sheets of thermoplastic resin subjected to the action of sunlight.

It is therefore desirable to protect, especially against the effects of solar radiation, sheets of thermoplastic resin which in service are exposed to solar radiation.

A technique which can be exploited for achieving this protection consists of incorporating anti-UV agents such as benzophenone derivatives or benzotriazole derivatives into the compositions employed for the manufacture of the sheets.

In view of the fact that these anti-UV agents are expensive because they are difficult to synthesise and that only the anti-UV agents present in the surface layer of the sheets are active for protection against the action of ultraviolet rays, attempts have been made to develop techniques which are applicable to shaped sheets and make it possible to concentrate the anti-UV agent in the surface layer of these sheets.

Thus, it has been proposed to coat the finished sheets by means of a protective varnish containing the anti-UV agent, but this technique involves the delicate development of particular varnishes, which are necessarily expensive, in order to achieve lasting anchoring of the protective layer.

It has also been proposed to steep the sheets in solvents which dissolve the anti-UV agent and are capable of exerting a limited swelling action on the surface layer of resin. As a result of this, the anti-UV agent penetrates superficially into the softened part of the sheets and remains dispersed therein after evaporation of the solvent. However, this latter technique entails the treatment of both faces of the sheets, which is neither necessary nor desirable and makes it essential to resort to large drying installations. Furthermore, the technique is very difficult to carry into practice when it is a question of treating relatively rigid continuous sheets.

Finally, it has been proposed to surface-coat at least one of the faces of the sheets by means of a solution of the same type as that used in the steeping technique. This technique, which proves particularly economical and effective, can, however, not be exploited for the treatment of sheets having been subjected to an orientation treatment. In fact, it has been found that this technique causes the release of the orientation tensions induced in the surface region of the sheets, which has the consequence of cracks appearing; these cracks are the starting points of breaks and render the sheets fragile. This results in a substantial decrease in the mechanical properties acquired during orientation, and in a shrinkage of the sheet. Finally, this technique is difficult to exploit in the case of non-planar oriented sheets such as corrugated sheets.

There has now been found, in accordance with the present invention a process for the protection, against the action of ultraviolet rays, of oriented sheets of thermoplastic resin, which proves particularly effective and economical and does not suffer from the disadvantages of the known processes.

Accordingly, the present invention relates to a process for the manufacture of oriented sheets of thermoplastic resin which are protected against the action of ultraviolet rays, which comprises extruding a sheet from the resin, conditioning this sheet to a temperature favouring orientation by stretching, stretching the conditioned sheet in at least one direction so as to induce molecular orientation tensions in the sheet, and cooling the stretched sheet under tension to a temperature below the second order transition temperature of the resin, according to which, before stretching the conditioned sheet, a solution comprising at least one solvent exerting a swelling action on the resin and at least one anti-UV agent which is soluble in the solvent is applied to at least one of the faces of the sheet, and the solvent is caused to evaporate.

On following this procedure, it has been found that the stretching of the sheet, subsequent to coating, in no way alters the ability to resist ultraviolet rays which has been imparted to the sheet and, in particular, that the thickness of the surface layer or layers containing the anti-UV agent remains sufficient, after stretching, to impart efficient protection to this sheet.

It has further been found that the stretching of the sheet after coating does not cause any surface cracks, nor the appearance of any other defect.

The amount of anti-UV agent deposited on the sheet in the form of a solution is chosen taking into account the stretching ratios applied subsequently during manufacture of the oriented sheets, and the final amount which it is desired to distribute over the surface of the oriented sheets. The amount of anti-UV agent deposited, during coating, per square metre of treated surface of the sheet before stretching is preferably between 10 and 30 g/m$^2$.

Any anti-UV agent can be used. It is in particular chosen in accordance with the nature of the thermoplastic resin of which the sheet consists and the severity of the service conditions of the sheets. By way of examples of anti-UV agents which can be used there may be mentioned the benzophenone derivatives such as the hydroxylic and alkoxylated derivatives, the benzotriazole derivatives, the substituted acrylonitriles and the aryl esters. However, where the resin is based on polyvinyl chloride, the applicant company prefers benzophenone derivatives such as 2,2-dihydroxy-4-methoxybenzophenone, 2-hydroxy-4-methoxybenzophenone and 2-hydroxy-4-n-octoxybenzophenone. It is also possible to employ several different anti-UV agents.

The amount of anti-UV agent present in the treatment solution in general varies between 5 and 40% by weight of the solution. It is preferably between 10 and 30%. It is in particular chosen in accordance with the amount of anti-UV agent which it is desired to deposit and the properties of the thermoplastic resin of which the sheets consist.

The choice of the solvent or solvents used to produce the solution employed for the coating is made taking into account the following conditions: (1) it is necessary to dissolve the anti-UV agent used, (2) the solvent must, under the conditions of treatment, exert a swelling action on the surface of the resin so as to permit the penetration of the anti-UV agent.

Finally, for reasons which are easily understandable, it is furthermore necessary that the solvent or solvents should be as inexpensive as possible, that they should preferably be non-toxic and non-inflammable under the use conditions, and that they should not exert an adverse effect on the aging resistance of the sheet. According to an advantageous variant of the process according to the invention, a solvent which tends to improve the aging resistance of the sheet is chosen.

It follows that the choise of the solvent or solvents of the treatment solution is a function of the nature of the resin of which the sheets consist and can be determined, in each case, by preliminary experiments.

Thus, when the sheet consists of a resin based on a polyvinyl chloride such as a homopolymer of vinyl chloride or a copolymer containing at least 50 mol % of units derived from vinyl chloride, the applicant company prefers to use, as the solvent, the chlorinated solvents derived from hydrocarbons containing from 1 to 3 carbon atoms, such as methylene chloride and the dichloroethanes. The best results are obtained with a solution made up by using a mixture of 1,1,2-trichloroethane and tetrachloroethylene in the weight ratio of between 1.5 and 3, with this solution containing from 10 to 40 g of anti-UV agent per 100 g of solution. In this case, the amount of solution deposited per face and per square meter of sheet to be treated can advantageously be between 20 and 200 g.

In order to facilitate the dissolving of the anti-UV agent or agents in the solvent or solvents and the penetration of the solution into the superficial layer of the treated surface of the sheets, it is advantageous to employ the solution at a temperature above ordinary temperature and below the boiling point, preferably under normal pressure.

Equally, the penetration of the solution is facilitated by the fact that the sheets are at a relatively high temperature, in general at a temperature above the second order transition temperature. Hence, in order that there should be sufficient time for the solution to penetrate to a sufficient degree, it is advantageous to choose solvents or solvent mixtures which have a boiling point, preferably under normal pressure, above the temperature of the sheets to be treated.

Taking into account the boiling points of 1,1,2-trichloroethane and of tetrachloroethylene (114° C. for 1,1,2-trichloroethane and 121° C. for tetrachloroethylene) the solutions based on this mixture of solvents can be used to treat sheets which are at a temperature of 90° to 115° C. In this temperature range, orientation tensions can be induced by stretching sheets of resins based on polyvinyl chloride.

It is preferred to apply the solution to sheets which are at a temperature which favours orientation by stretching, this temperature being reached, for example, by causing the extruded sheet to pass, beforehand, over one or more cooling rolls. However, treating the sheets which are at a temperature below or above their orientation temperature is in no way excluded, provided, of course, that these sheets are brought to their orientation temperature after the anti-UV treatment and, in any case, before the stretching treatment.

The treatment solution is preferably applied by coating onto the face or faces to be treated, and this does not present any particular problem if the faces are plane and the solutions are of low viscosity. For this purpose it is possible to use, for example, one or two sets of sprays or any other equivalent means. The application can advantageously be effected continuously and can thus easily be integrated into an installation for the continuous manufacture of oriented sheets.

After the treatment solution has been deposited, the solvent is caused to evaporate. However, this evaporation can only be brought about when the solution has been able to penetrate sufficiently into the surface layer of the treated face or faces of the sheets. The time between the application and the evaporation can vary widely, especially in accordance with the desired depth of penetration, the nature of the solvent or solvents, of the anti-UV agent or agents and of the resin, as well as the temperature of the sheet. In general, this time is less than 60 seconds. Preferably, it is between 10 and 40 seconds.

To ensure evaporation, it is advantageous to pass the sheet through a chamber where the solvent is vaporised. The solvent can thus be recovered by condensation, and be recycled. Where the vapours of solvent prove toxic, it is possible to render this chamber leak-proof or to apply suction to it. The chamber is preferably kept at the chosen temperature for the subsequent stretching and orientation treatment. However, it is permissible to keep this chamber at a different temperature from the temperature intended for the subsequent stretching, provided the chamber is followed by a heat conditioning installation which brings the sheet to its optimum temperature for orientation. The working conditions for evaporation (temperature, pressure and duration) can easily be determined experimentally from case to case.

When the solvent has substantially been removed, the sheet enters, if necessary, a heat conditioning installation and is then taken up in a monoaxial or biaxial stretching installation, the sheet thus stretched then being returned, under tension, to a temperature below the second order transition temperature of the resin of which the sheet consists. If desired, the sheet which has been oriented by stretching can optionally be corrugated, for example by exploiting the technique described in the above-mentioned U.S. Pat. Nos. 3,744,952 or 3,834,853.

According to a preferred embodiment of the process according to the invention, a sheet of plastic is extruded continuously, the extruded sheet is brought to its orientation temperature by passing it between heat conditioning rolls, the conditioned sheet is coated continuously by means of an anti-UV treatment solution, the solvent of the solution is then vaporised by passing the coated sheet through a chamber kept at the orientation temperature of the treated sheed and finally the sheet is passed through the installation for orientation by stretching.

As explained above, numerous parameters can be varied when applying the process according to the invention. These, for the main part, effect the thickness of the superficial layer on the surface of the sheets treated according to the process. Hence, numerous means for obtaining the desired thickness are available. In general, this thickness is greater than 30 microns and preferably between 60 and 150 microns.

As has been stated, the process according to the invention can be used for numerous applications. One of the most interesting is protection against ultraviolet radiation of the transparent, translucent or opaque bioriented corrugated sheets, based on polyvinyl chloride, which find numerous uses in building. Furthermore, it is obvious that the process according to the invention can be applied to the production of any other article which is oriented by stretching, such as a film, a plate, a profile, a net or a strip, and not only to the manufacture of sheets in the strict sense of this term. Accordingly, sheets are to be understood as all articles, in general of very great length, which have at least one plane surface before orientation by stretching.

The process according to the invention is furthermore illustrated by the practical embodiment which will now be presented. Of course, this example is given by way of illustration and cannot entail any limitation of the scope of the present invention.

EXAMPLE

A polyvinyl chloride sheet is extruded continuously by means of an extruder equipped with a flat die of 82 cm width, the temperature of the die being between 200° and 220° C. The extruded sheet is then polished and cooled by passing between three consecutive rolls kept at a temperature of 115° C. The sheet leaving the rolls has a thickness of 4.45 mm and a surface temperature of 120° C. and travels at a speed of 1.3 m/min.

A solution containing 30% of 1,1,2-trichloroethane, 50% of tetrachloroethylene and 20% of 2-hydroxy-4-methoxy-benzophenone, the percentages being expressed by weight, is applied to the upper face of the sheet which has been conditioned in this way. The solution is deposited at the rate of 17.5 g/m$^2$ of surface of the sheet.

The sheet then passes through a closed chamber 2 metres long, the entry of which is at a distance of 20 to 50 cm from the point at which the application takes place. This chamber is equipped with a circulating fan and an extraction fan and is kept at a temperature of 120° C. The solvent vapours are extracted from the chamber and condensed for the purpose of being recycled.

The dried sheet then passes over a set of rolls for longitudinal stretching, the speeds of the rolls being regulated so as to stretch the sheet longitudinally by 100%, and the stretching rolls being maintained at 115° C. The edges of the sheet which has been stretched in this way are then seized by clips mounted on a transverse stretching installation which stretch the sheet transversely by 100%. The operation of transverse stretching of the sheet is carried out in a closed and ventilated chamber maintained at 106° C.

Finally, the doubly stretched sheet, still held by its edges by means of transverse stretching clips, is introduced into a corrugation installation such as that described in the above-mentioned U.S. Pat. No. 3,834,853 and designed to give a longitudinally corrugated sheet of sinusoidal profile, having a final width of 1.097 metres and exhibiting a sinuosity ratio of 1.2.

The corrugated sheet thus produced has a tensional resilience, at 20° C., of 1,800 kg.cm/cm$^2$, which remains unchanged after 36 months' exposure of the treated face to the action of solar radiation.

By way of comparison, an identical bioriented corrugated sheet which, however, is untreated, initially has an identical tensional resilience which, after 36 months' exposure to the action of solar radiation in Belgium, drops to a value of 720 kg.cm/cm$^2$.

We claim:

1. Process for the manufacture of an oriented sheet of thermoplastic resin which is protected against the action of ultraviolet rays, which comprises extruding a sheet from the resin, conditioning this sheet to a temperature favoring orientation by stretching, stretching the conditioned sheet in at least one direction so as to induce molecular orientation tensions in the sheet, and cooling the stretched sheet under tension to a temperature below the second order transition temperature of the resin, comprising:

before stretching the conditioned sheet, applying to at least one of the faces of the sheet a solution comprising at least one solvent exerting a swelling action on the resin and between 5 and 40% weight of at least one anti-UV agent which is soluble in the solvent, the amount of solution deposited per square metre of surface of the sheet being between 20 and 200 g, and evaporating the solvent less than 60 seconds after applying the solution to the sheet.

2. Process according to claim 1, wherein the amount of solution deposited by coating on one face is such that the amount of anti-UV agent deposited per square metre of sheet before stretching varies between 2 and 50 g.

3. Process according to claim 1, wherein the solvent is selected from the group consisting of the chlorinated solvents derived from hydrocarbons containing from 1 to 3 carbon atoms.

4. Process according to claim 1, wherein the sheet to be treated consists of a resin based on polyvinyl chloride.

5. Process according to claim 4, wherein the solution consists of a mixture of 1,1,2-trichloroethane and tetrachloroethylene in a weight ratio of between 1.5 and 3, containing from 10 to 40 g of an anti-UV agent per 100 g of solution.

6. Process according to claim 4, wherein the anti-UV agent is a benzophenone derivative.

7. Process according to claim 1, wherein the faces of the sheet to which the solution is applied are, at the time of application, at a temperature which favors orientation by stretching.

8. Process according to claim 1, wherein the solvent is evaporated by passing through a chamber under reduced pressure, the chamber being maintained at the temperature chosen for the treatment of orientation by stretching.

* * * * *